(12) United States Patent
Asai et al.

(10) Patent No.: US 8,381,850 B2
(45) Date of Patent: Feb. 26, 2013

(54) FUEL CELL SYSTEM FOR VEHICLE AND VEHICLE

(75) Inventors: Akihiro Asai, Yokosuka (JP); Hisashi Nakata, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 739 days.

(21) Appl. No.: 11/793,338

(22) PCT Filed: Nov. 30, 2005

(86) PCT No.: PCT/JP2005/022414
§ 371 (c)(1),
(2), (4) Date: Jun. 19, 2007

(87) PCT Pub. No.: WO2006/067962
PCT Pub. Date: Jun. 29, 2006

(65) Prior Publication Data
US 2008/0093140 A1  Apr. 24, 2008

(30) Foreign Application Priority Data
Dec. 21, 2004  (JP) .................................. 2004-370054

(51) Int. Cl.
*B60K 6/42* (2007.10)

(52) U.S. Cl. ..................................... 180/65.22; 180/291

(58) Field of Classification Search ............... 180/65.22, 180/65.31, 291; 429/34
See application file for complete search history.

(56) References Cited

U.S. PATENT DOCUMENTS

| | | | |
|---|---|---|---|
| 2,814,524 A * | 11/1957 | Porsche et al. | 296/181.2 |
| 3,759,540 A * | 9/1973 | Olson | 280/784 |
| 4,422,685 A * | 12/1983 | Bonfilio et al. | 296/193.04 |
| 6,100,471 A | 8/2000 | Fouache | |
| 6,598,691 B2 * | 7/2003 | Mita et al. | 180/65.1 |
| 7,040,432 B2 | 5/2006 | Kawasaki et al. | |
| 2003/0146026 A1 * | 8/2003 | Enjoji et al. | 180/65.1 |
| 2004/0094340 A1 * | 5/2004 | Kawasaki et al. | 180/65.1 |
| 2004/0151963 A1 * | 8/2004 | Buchanan et al. | 429/34 |
| 2005/0173892 A1 * | 8/2005 | Terminello | 280/490.1 |
| 2006/0102398 A1 | 5/2006 | Mizumo | |

FOREIGN PATENT DOCUMENTS

| | | |
|---|---|---|
| DE | 42 31 049 A1 | 3/1994 |
| DE | 44 17 470 C1 | 5/1995 |
| DE | 101 45 357 C1 | 5/2003 |
| EP | 1 533 161 A1 | 5/2005 |
| EP | 1 547 845 A1 | 6/2005 |
| JP | 48-6246 | 2/1973 |
| JP | 2000-108948 A | 4/2000 |
| JP | 2002-141078 A | 5/2002 |

(Continued)

*Primary Examiner* — J. Allen Shriver, II
*Assistant Examiner* — Bryan Evans
(74) *Attorney, Agent, or Firm* — Foley & Lardner LLP

(57) ABSTRACT

A fuel cell system for a vehicle (1) includes a fuel cell (14) configured to react fuel gas and oxidizing gas with each other and generate electricity; a system frame (20) fixed under a floor of a body of the vehicle and supporting the fuel cell (14); a driving motor (43) configured to drive the vehicle, arranged in a motor compartment (R2); and a high-voltage cable (101, 102) configured to transmit high-voltage power generated by the fuel cell (14) to the driving motor (43), the high-voltage cable (101, 102) having apart extended across the system frame, the part is arranged on an inner side of the system frame (20) and is along a frame member (22) of the system frame (20).

13 Claims, 6 Drawing Sheets

FOREIGN PATENT DOCUMENTS

| | | |
|---|---|---|
| JP | 2004-127747 A | 4/2004 |
| JP | 2004-161055 A | 6/2004 |
| JP | 2004-196217 A | 7/2004 |
| JP | 2004-244274 A | 9/2004 |
| WO | WO 03/104010 A1 | 12/2003 |
| WO | WO 2004/020237 A1 | 3/2004 |
| WO | WO 2004/030968 A1 | 4/2004 |
| WO | WO 2004030968 A1 * | 4/2004 |

* cited by examiner

FUEL CELL SYSTEM FOR VEHICLE AND VEHICLE

TECHNICAL FIELD

The present invention relates to a fuel cell system for a vehicle and a vehicle.

BACKGROUND INVENTION

An electric vehicle such as a fuel cell equipped vehicle generally employs high-voltage power of about several hundreds of volts to operate a drive motor. To transmit such high-voltage power, a high-voltage cable is used. At the time of an accident, such as a collision, it is undesirable if the high-voltage cable breaks and leaks a high-voltage current to the vehicle body and vehicle mounted devices.

To protect the high-voltage cable, Japanese Unexamined Patent Application Publication No. 2004-127747 proposes a structure employing a body frame that functions as a vehicle body and as a system frame for supporting a fuel cell system. A fuel gas line and the high-voltage cable are arranged on the left and right sides of the body frame, respectively.

Japanese Unexamined Patent Application Publication No. 2004-161055 proposes a new monocoque body (frameless body) provided with additional floor frame members for protecting a fuel gas line and high-voltage cable. A fuel cell box containing a fuel cell and peripheral devices is mounted on the additional floor frame members. The additional floor frame members, side sills, and a rear frame are combined to form a Y-shaped frame. The high-voltage cable and fuel gas line are arranged between the branches of the Y-shaped frame.

DISCLOSURE OF THE INVENTION

Employing a monocoque body such as the one mentioned in the related art is mainstream technology at present. However manufacturing a monocoque body provided with additional floor frame members for protecting a high-voltage cable and fuel gas line increases the cost of a vehicle.

An object of the present invention is to provide a fuel cell system for a vehicle, capable of employing an existing monocoque body instead of that provided with additional floor frame members while ensuring protection of a high-voltage cable.

In order to accomplish the object, an aspect of the present invention provides a fuel cell system for a vehicle, having a fuel cell configured to react fuel gas and oxidizing gas with each other and generate electricity; a system frame fixed under a floor of a body of the vehicle and supporting the fuel cell; a driving motor configured to drive the vehicle, arranged in a motor compartment; and a high-voltage cable configured to transmit high-voltage power generated by the fuel cell to the driving motor, the high-voltage cable having a part that is extended across the system frame, the part arranged on an inner side of the system frame and along a frame member of the system frame.

BEST MODE FOR CARRYING OUT THE INVENTION

The embodiments of the present invention will be explained with reference to the drawings.

(First Embodiment)

Figure 1:
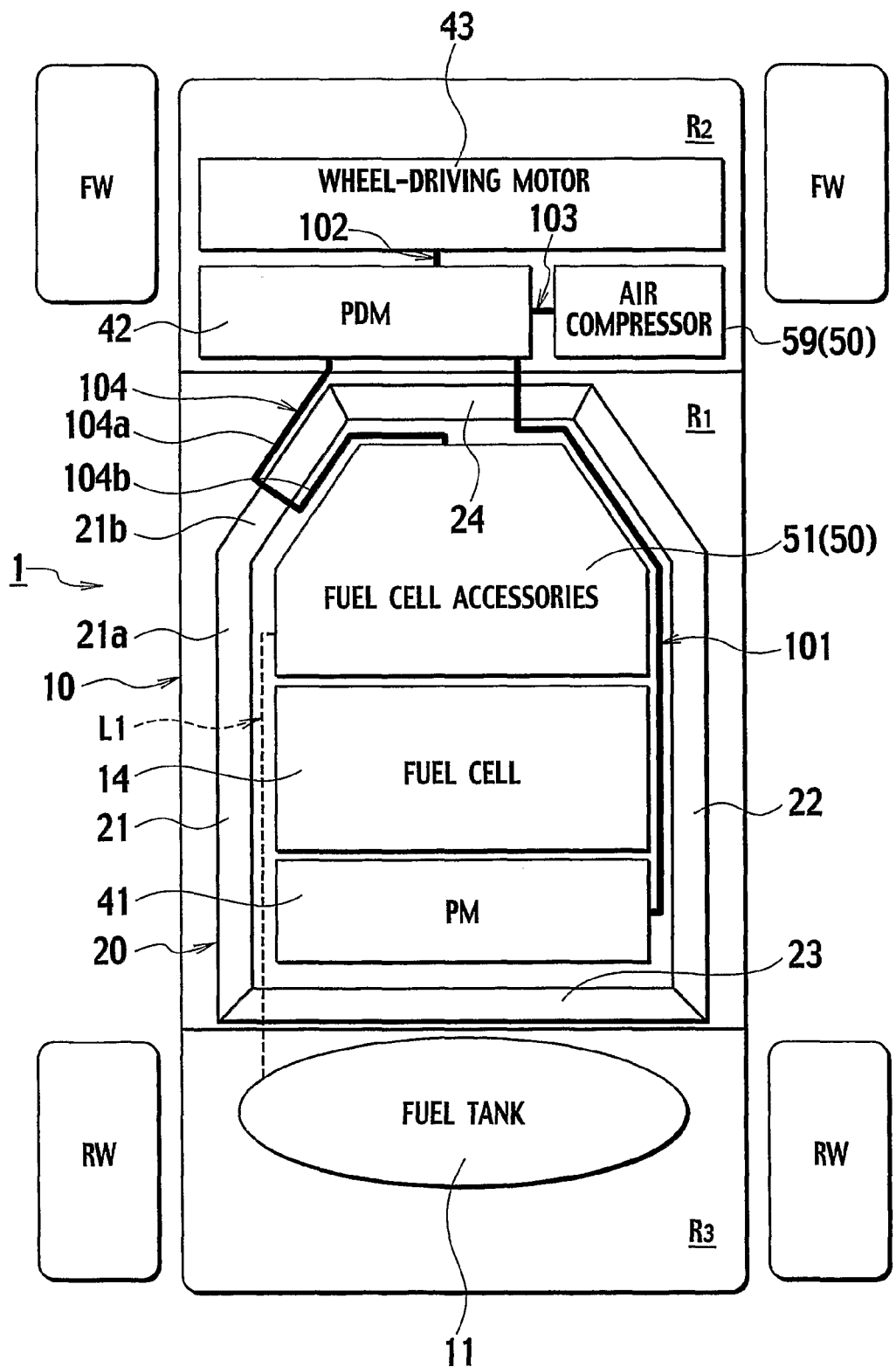
FIG. 1 is a plan view showing a fuel-cell-equipped vehicle according to a first embodiment of the present invention.

FIG. 1 shows a fuel-cell-equipped vehicle according to the first embodiment of the present invention. A body of the vehicle and a fuel cell system arranged on the body will be explained.

Vehicle Body

The body of the fuel-cell-equipped vehicle 1 according to the first embodiment is an existing monocoque body (frameless body). In FIG. 1, the vehicle 1 includes a passenger compartment R1 having a front seat and a rear seat, a front compartment R2 defined on the front-wheel side of the passenger compartment R1, and a rear compartment R3 defined on the rear-wheel side of the passenger compartment R1. The passenger compartment R1 and front compartment R2 are separated from each other by, for example, a dash panel. The passenger compartment R1 and rear compartment R3 are separated from each other by, for example, the rear seat.

The fuel-cell-equipped vehicle 1 is a front-wheel-drive vehicle with a driving motor 43 driving the front wheels. The driving motor 43 is arranged in the front compartment R2, serving as a motor compartment.

Fuel Cell System

The fuel cell system installed in the vehicle 1 includes a power plant 10 having a fuel cell 14, a fuel tank 11 for storing fuel gas (such as hydrogen gas) to be supplied to the fuel cell 14, a power delivery module 42 for transmitting power generated by the fuel cell 14 to at least the driving motor 43 to drive the wheels with the power supplied from the power delivery module 42.

The driving motor 43 is arranged in the front compartment R2 as mentioned above. The power plant 10 is arranged under the floor of the passenger compartment R1, i.e., under a floor panel 3. The fuel tank 11 is arranged under the floor (floor panel 3) around a boundary between the rear compartment R3 and the passenger compartment R1.

Fuel Tank

The fuel tank 11 has a tank body that stores a compressed high-pressure fuel gas to be supplied to the fuel cell 14. The fuel tank 11 is provided with an open-close valve at an outlet of the tank body and a pressure reduction valve to reduce the pressure of the fuel gas, from the open-close valve, to a safe level.

Power Plant

The power plant 10 includes the fuel cell 14 to react fuel gas and oxidizing gas with each other and generate electricity, an accessory module 51 containing most of fuel cell accessories 50 that operate when the fuel cell 14 generates electricity, and a power manager 41, i.e., DC-DC converter to stabilize power generated by the fuel cell 14, which may vary depending on operating conditions. The fuel cell 14, accessory module 51, and power manager 41 are mounted on and fixed to a system frame 20 that is fixed under the floor of the vehicle body.

According to the first embodiment, an air compressor 59, among the fuel cell accessories 50, is arranged in the motor compartment R2 instead of on the system frame 20.

The fuel cell 14 is a known solid polymer electrolyte fuel cell consisting of several hundreds of stacked cell elements, each generating a power of several volts. The fuel cell 14 functions as a high-voltage power supply source that provides a power of several hundreds of volts.

Figure 2:
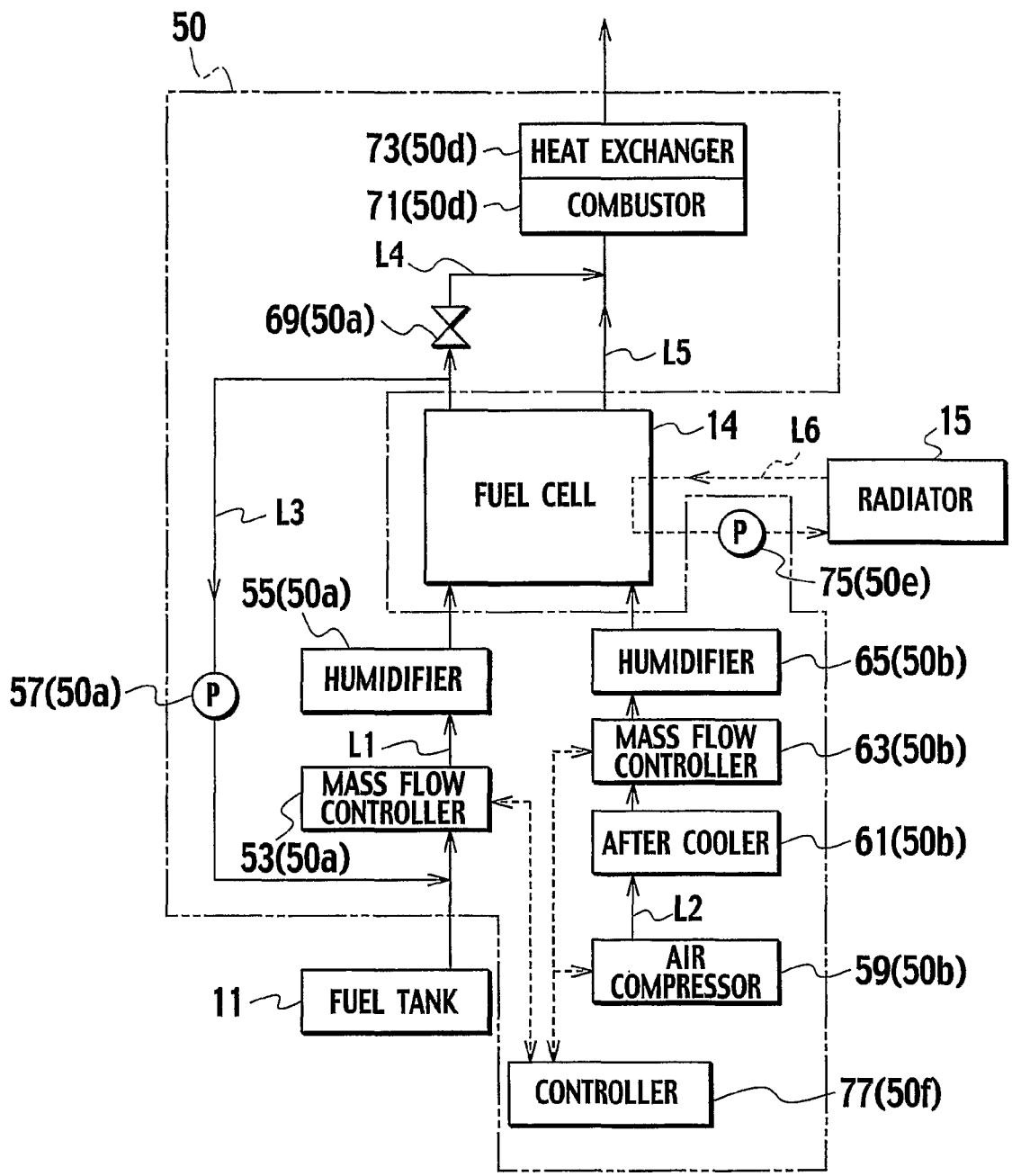
FIG. 2 is a block diagram showing fuel cell accessories arranged in the vehicle of FIG. 1.

FIG. 2 shows the details of the fuel cell accessories 50 that operate when the fuel cell 14 generates power. The accessories 50 are classified into fuel gas supply accessories 50a related to supplying fuel gas, oxidizing gas supply accessories 50b related to supplying oxidizing gas, discharge accessories 50c and 50d related to discharging exhaust gas from the fuel cell 14, temperature control accessories 50e related to maintaining the operating temperature of the fuel cell 14 at a predetermined level, and control accessories 50f related to controlling the operating conditions of the accessories.

The fuel cell accessories 50 will be explained in detail with reference to FIG. 2.

Connections among the accessories 50 will be explained.

The fuel gas supply accessories 50a are arranged in lines L1 and L3 that supply fuel gas to the fuel cell 14. The accessories 50a include a mass flow controller 53 for adjusting the pressure and quantity of fuel gas to be supplied to the fuel cell 14 and a humidifier 55 for adjusting the humidity of the fuel gas to be supplied to the fuel cell 14. The accessories 50a also include a pump 57 arranged in the fuel gas circulation line L3. The pump 57 serves as a fuel gas circulator to return an unreacted fuel gas discharged from the fuel cell 14 to the upstream side of the fuel gas supply line L1. The fuel gas circulator may be an ejector instead of the pump. The accessories 50a also include a purge valve 69 for opening/closing a fuel gas discharge line L4, to purge a high-impurity-concentration fuel gas from the fuel gas circulation line L3 to the fuel gas discharge line L4.

The oxidizing gas supply accessories 50b are arranged in an oxidizing gas supply line L2 for supplying oxidizing gas to the fuel cell 14. The accessories 50b include the air compressor 59 serving as an oxidizing gas supply device for supplying a compressed oxidizing gas to the fuel cell 14, an after cooler 61 for cooling the compressed oxidizing gas, a mass flow controller 63 for controlling the pressure and quantity of the compressed oxidizing gas supplied to the fuel cell 14, and a humidifier 65 for controlling the humidity of the compressed oxidizing gas supplied to the fuel cell 14.

The discharge accessories 50d are arranged in an exhaust line L5 for discharging an exhaust gas from the fuel cell 14. The accessories 50d include a combustor 71 for combusting an unreacted gas purged from the purge valve 69 so that an exhaust gas may satisfy environmental standards and a heat exchanger 73 for reclaiming heat generated by the combustor 71 and heating the fuel cell 14 to an optimum operating temperature.

The temperature control accessories 50e are arranged in a coolant circulation line L6 for circulating a coolant between the fuel cell 14 and a radiator 15. The accessories 50e include a pump 75 serving as a coolant circulator for circulating the coolant.

The control accessories 50f include a system controller 77 for controlling the above-mentioned and other accessories. The system controller 77 issues, according to detected signals by various sensors, control signals to control the quantity, pressure, and humidity of gasses (fuel gas and oxidizing gas) supplied to the fuel cell 14, thereby controlling the amount of power generated by the fuel cell 14. The system controller 77 may also issue other control signals.

System Frame

The system frame 20 for supporting the power plant 10 comprises a combination of frame members 21, 22, 23, and 24. Namely, the system frame 20 comprises of a pair of side frame members (side members 21 and 22) that are spaced from each other in a left-right direction and extend in a front-rear direction of the vehicle, the front cross member 24 for connecting front ends of the side members 21 and 22 to each other, the rear cross member 23 for connecting rear ends of the side members 21 and 22 to each other, and a plurality of center cross members (not shown) for connecting intermediate parts of the side members 21 and 22 to each other. The lower part of the system frame 20 is entirely covered by an under cover 25 (FIG. 3).

Figure 3:
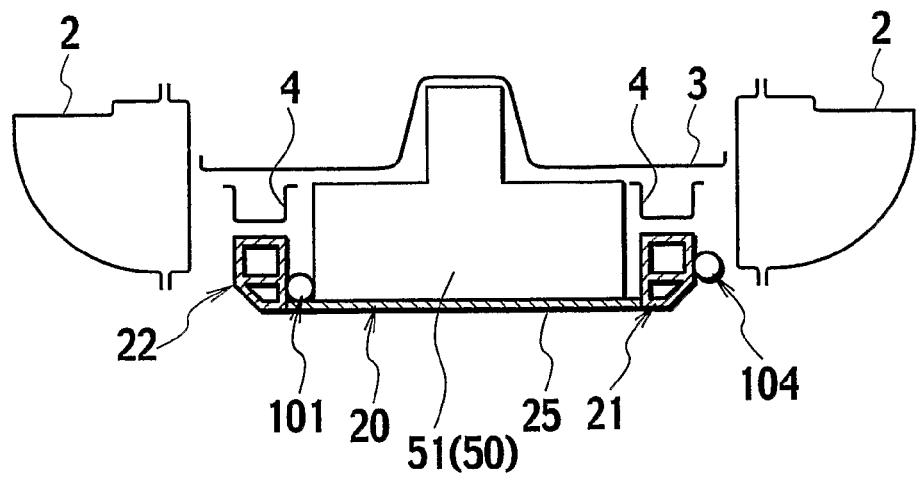
FIG. 3 is a sectional view showing a structure for supporting a high-voltage cable in the vehicle of FIG. 1.

In FIG. 3, the system frame 20 is arranged at a central part of the vehicle and is attached to bottom faces of side extension members 4 by fastening members. The side extension members 4 are attached to floor panel 3 of the vehicle body. To ensure sufficient strength, the frame members 21 to 24 are made of metal such as iron and aluminum and each have a hollow structure that may be formed by longitudinal extrusion.

Power Manager

High-voltage power generated by the fuel cell 14 varies depending on the operating conditions of the fuel cell 14. To minimize the variations, the power manager 41 stabilizes the power to substantially a constant voltage. The stabilized high-voltage power is transmitted from the power manager 41 through a high-voltage cable 101 to the power delivery module 42.

Power Delivery Module

The power delivery module 42 receives the high-voltage power from the fuel cell 14 through the power manager 41 and delivers the power to the driving motor 43 and electrical devices (for example, the air compressor 59) of the fuel cell accessories 50. The power delivery module 42 may convert the high-voltage power into low-voltage power and deliver the low-voltage power to other electrical devices of the accessories 50.

High-Voltage Cable

As mentioned above, the high-voltage cable 101 electrically connects the power manager 41 to the power delivery module 42, to pass a current of several hundreds of volts. A cable 102 connecting the power delivery module 42 to the driving motor 43 is also a high-voltage cable. On the other hand, cables 103 and 104 connecting the power delivery module 42 to the fuel cell accessories 50 (the accessory module 51 and air compressor 59) pass a current of a relatively low voltage.

Since the high-voltage cables 101 and 102 pass a current of several hundreds of volts, they had better not be damaged or broken in, for example, a vehicle crash. According to the embodiment, the high-voltage cable 102 is arranged in the motor compartment R2, and therefore, is sufficiently protected thereby. Accordingly, the cable 102 needs no special protective structure. On the other hand, the high-voltage cable 101 is arranged on a side of the vehicle widthwise center and extends along the length of the side member 22. With this arrangement, the frame member 22 protects the high-voltage cable 101 from an external force that may be caused by a vehicle collision.

The cable 104 connecting the power delivery module 42 to the accessory module 51 passes a current of a relatively low voltage. To avoid damage or breakage of the cable 104 in a vehicle collision, a part 104b of the cable 104 that is on an inner side of the system frame 20 is extended along the side member 21, and a part 104a of the cable 104 that is on an outer side of the system frame 20 also extends along the side member 21.

Effects

Effects of the first embodiment will be explained.

The high-voltage cable 101 for transmitting a high-voltage current is arranged on the inner side of the system frame 20 and extends along one frame member (side member 22) of the system frame 20. With this arrangement, the frame member 22 protects the high-voltage cable 101 against an external force caused by, for example, a vehicle collision.

Namely, the system frame 20 for attaching the fuel cell 14 and accessory module 51 to an existing monocoque body can protect the high-voltage cable 101 without additional floor frame members.

The high-voltage cable 101 is extended along and attached to the frame member (side member 22) of the system frame 20 and is arranged between the side member 22 and the accessory module 51. Compared with a structure that arranges the high-voltage cable 101 through accessories mounted on the system frame 20, the arrangement of the embodiment reduces the influence of noise from the high-voltage cable 101 on various signals, such as control signals sent to the accessory module 51 and detected signals sent from sensors.

The power delivery module 42 is arranged in the motor compartment R2 that accommodates and protects the driving motor 43, which is a typical high-voltage device. Accordingly, the high-voltage cable 102 connecting the power delivery module 42 to the driving motor 43 is protected, together with the driving motor 43, in the motor compartment R2.

The cable 104 includes a part 104a that is extended along the outer side of the system frame 20 and is exposed from the system frame 20. The part 104a is closely attached to the frame member (side member 21) of the system frame 20, to reduce the probability of peripheral parts hitting the part 104a when the peripheral parts are deformed due to, for example, a vehicle crash.

The exposed part 104a of the cable 104 extends along a diagonal part 21b of the side member 21 that is on a vehicle widthwise inner side from a part 21a of the side member 21. With this arrangement, peripheral parts, if deformed, will first hit the part 21a of the side member 21, to reduce the possibility of the deformed peripheral parts hitting the part 104a.

The side member (frame member 22) of the system frame 20 to which the high-voltage cable 101 is attached is on a vehicle widthwise center side from each side sill 2. Accordingly, the high-voltage cable 101 is doubly protected by the side sills 2 and side member (frame member 22) of the system frame 20.

The frame member (side member 22) of the system frame 20, to which the high-voltage cable 101 is attached, is attached along the floor frame member (side extension member 4) of the vehicle body. This arrangement helps reinforce the strength of the frame member (side member 22), to ensure protection of the high-voltage cable 101.

The accessory module 51 and fuel cell 14 are both modules mounted on the system frame 20, and therefore, can be arranged close to each other to shorten connection parts such as connection pipes used to connect them to each other.

According to the first embodiment, the frame members 21 to 24 of the system frame 20 are a metal, such as iron and aluminum, to provide sufficient strength. These frame members 21 to 24 may be made of other materials as mentioned below.

(First Modification for Material of Frame Members)

It is preferable to cover the frame members 21 to 24 with an insulating material when manufacturing the frame members 21 to 24 from conductive metal. This is to prevent a short circuit of the high-voltage cable 101 when the sheath of the cable 101 is broken. The insulating material has a predetermined insulation resistance. The insulating material may be resin that is coated over the frame members 21 to 24, or any other material that is coated by electrodeposition over the frame members 21 to 24. The insulating material may simply be rubber material wound around only necessary parts of the frame members 21 to 24.

(Second Modification for Material of Frame Members)

The frame members 21 to 24 of the system frame 20 may be entirely made of insulating material, to provide the same effect as the first modification. If the insulating material is resin, the frame members 21 to 24 will be lighter than those made of metal, to reduce the total weight of the system frame 20.

Other embodiments of the present invention will be explained. In the following embodiments, the same or similar parts as those of the first embodiment are represented with like reference marks and explanations thereof are omitted.

(Second Embodiment)

Figure 4:
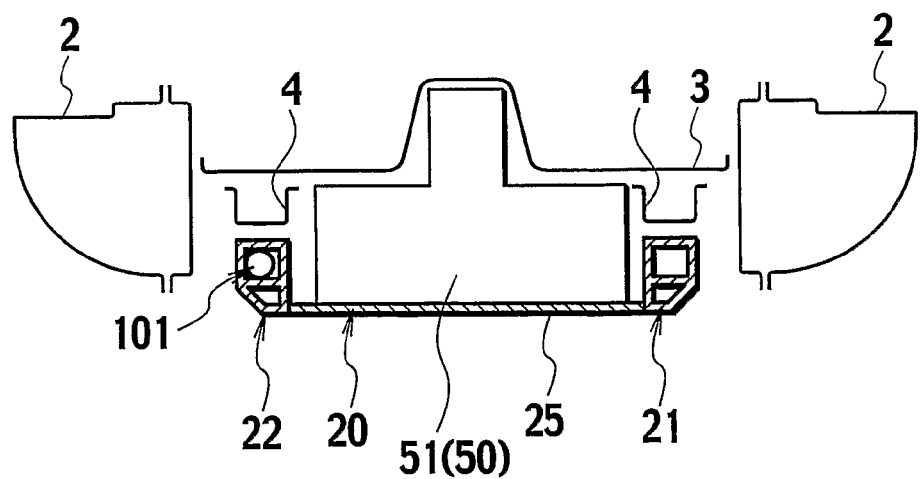
FIG. 4 is a sectional view showing a structure for supporting a high-voltage cable according to a second embodiment of the present invention.

FIG. 4 shows the second embodiment of the present invention. The second embodiment differs from the first embodiment in that a frame member (side member 22) of the system frame 20 is a hollow metal material and the high-voltage cable 101 is arranged inside the frame member (side member 22).

In addition to the effects of the first embodiment, the second embodiment provides an effect of saving an interior space of the system frame 20 because the high-voltage cable 101 is accommodated in the hollow frame member (side member 22) of the system frame 20.

In addition to the effects of the first embodiment, the frame member (side member 22) of the second embodiment provides a static electricity shielding effect. Namely, the frame member (side member 22) ensures prevention of noise emanating from the high-voltage cable 101.

(Third Embodiment)

Figure 5:
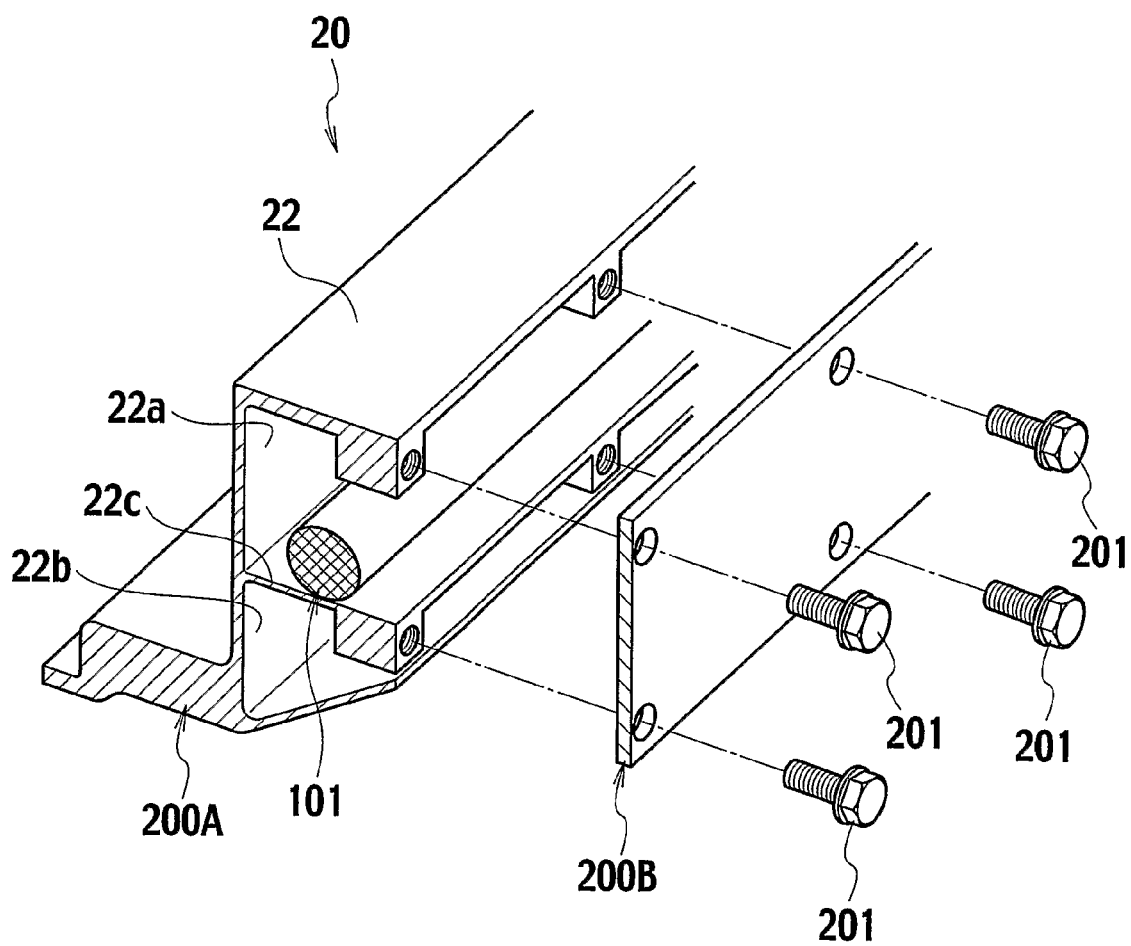
FIG. 5 is an exploded perspective view showing a structure for supporting a high-voltage cable according to a third embodiment of the present invention.

FIG. 5 shows the third embodiment of the present invention. Unlike the second embodiment that forms the frame members (side members 21 and 22) by extrusion, the third embodiment of FIG. 5 fabricates each of the hollow frame members (side members 21 and 22) with a frame body 200A having an open side, a lid or cover 200B, and fastening members such as bolts 201 that fix the frame body 200A and lid or cover 200B together.

Compared with the hollow frame member formed by extrusion, the hollow frame member (side member 22) fabricated with the frame body 200A having an open side and the lid or cover 200B according to the third embodiment is more easy to install the high-voltage cable 101 therein.

If it is not necessary for the frame member (side member 22) to provide a static electricity shielding effect, as there is a modification of the third embodiment that provides the frame body 200A with partial lids or covers 200B, so that the high-voltage cable 101 is easily arranged in the frame body 200A and the arranged cable 101 is secured therein without dropping.

(Fourth Embodiment)

Figure 6:
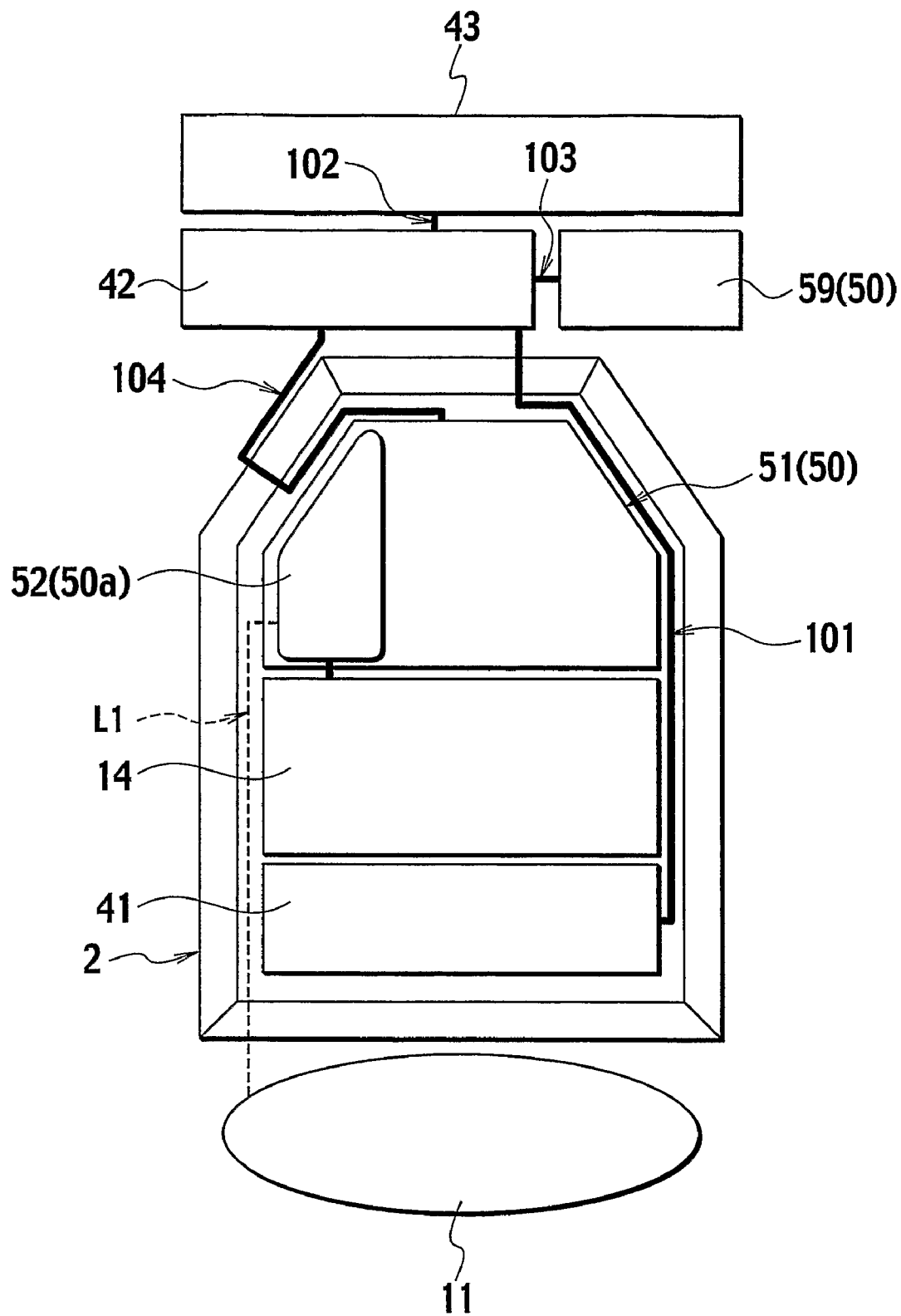
FIG. 6 is a plan view showing a fuel-cell-equipped vehicle according to a fourth embodiment of the present invention.

FIG. 6 shows the fourth embodiment of the present invention. The fourth embodiment separates the fuel gas supply accessories 50a from the accessory module 51 and accommodates the accessories 50a in a fuel gas supply accessory module 52. The module 52 is arranged opposite to the high-voltage cable 101 in a vehicle width direction.

The fourth embodiment provides the fuel gas supply accessory module 52 (50a) related to supplying fuel gas to the fuel cell 14 and arranges the module 52 and high-voltage cable 101 opposite to each other in the vehicle width direction. A fuel gas supply line L1 connected to the module 52 is arranged opposite to the high-voltage cable 101 in the vehicle width direction. This arrangement prevents the module 52 and fuel gas supply line L1 from being damaged simultaneously with the high-voltage cable 101. Separating the fuel gas supply line L1 and high-voltage cable 101 from each other on the left and right sides, respectively, improves maintenance workability.

The present invention is not limited to the above-mentioned embodiments and is achievable in various ways without departing from the scope of the present invention.

Figure 7:
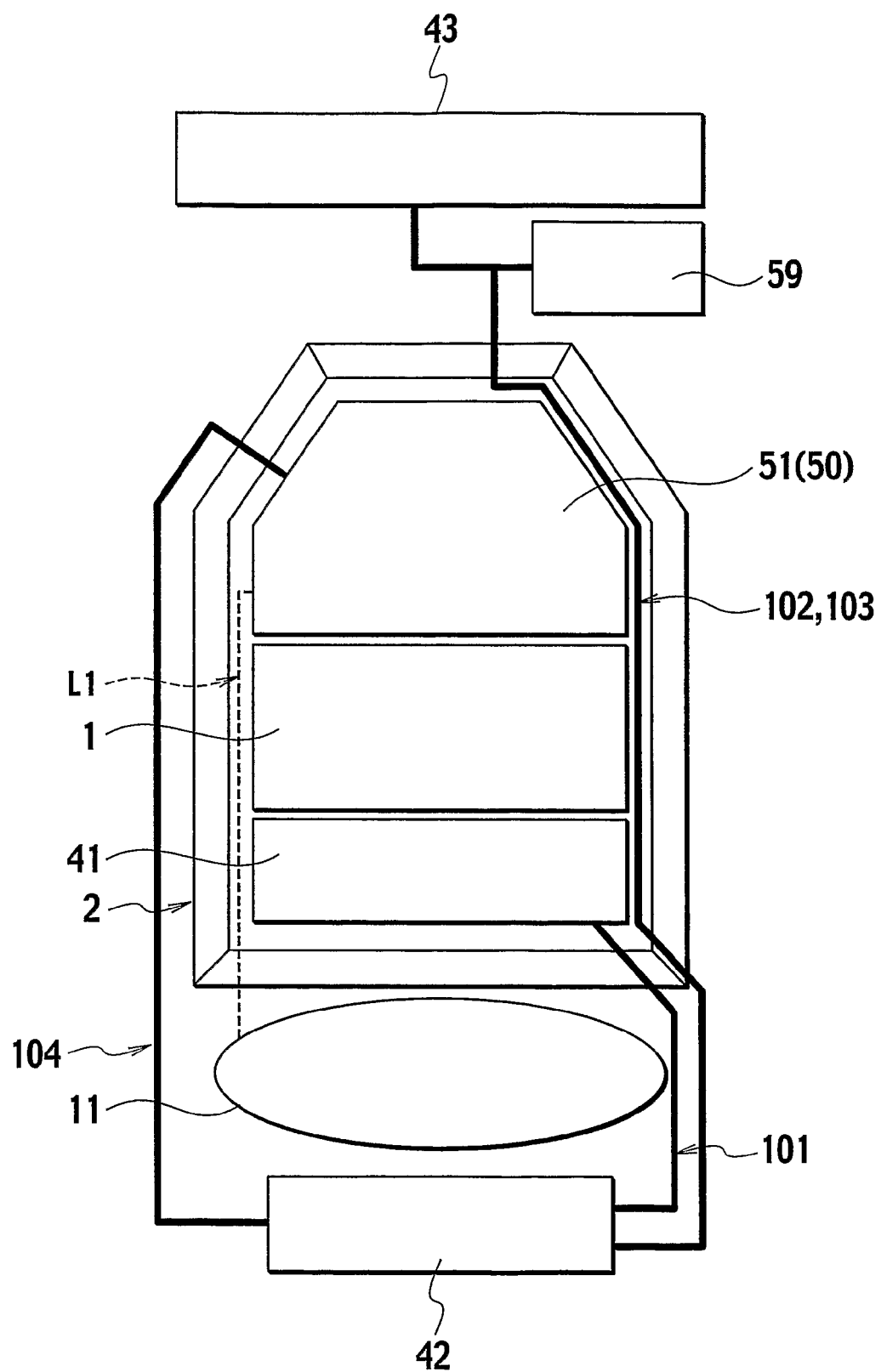
FIG. 7 is a plan view showing a fuel-cell-equipped vehicle according to a fifth embodiment of the present invention.

For example, the power delivery module 42, driving motor 43, and air compressor 59 arranged in the motor compartment according to the above-mentioned embodiments may be arranged differently. According to a fifth embodiment of the present invention shown in FIG. 7, the power delivery module 42 and driving motor 43 are arranged on each side of the system frame 20. A high-voltage current from the fuel cell 14 is transmitted to the driving motor 43 through high-voltage cables 102 and 103. Parts of the cables 102 and 103 that extend across the system frame 20 are arranged on a vehicle widthwise center side from a frame member of the system frame 20, to thereby provide the same effects as those provided by the first to fourth embodiments.

Although the above-mentioned embodiments relate to a front-wheel-drive vehicle having a front-wheel driving motor, the present invention is also applicable to rear-wheel-drive vehicles having rear-wheel driving motors, or four-wheel-drive vehicles having front and rear-wheel driving motors.

According to the above-mentioned embodiments, the fuel cell 14 is the only power source for the driving motor 43. According to an embodiment of the present invention, a battery may be arranged in addition to the fuel cell 14.

The above-mentioned embodiments employ the power delivery module 42 to supply a low-voltage current to the fuel cell accessories 50. According to an embodiment of the present invention, a low-voltage battery (for example, a 12-V battery) may be employed to supply a low-voltage current to the accessories 50.

In the above-mentioned embodiments, the frame members of the system frame 20 are hollow. According to other embodiments of the present invention, the frame members may have an L-shaped section, a closed hollow section, a T-shaped section, or the like if such sectional shapes can ensure required strength.

This application is based upon and claims the benefit of priority from the prior Japanese Patent Application No. 2004-370054 filed on Dec. 21, 2004, and the entire contents thereof are incorporated herein by reference.

Although the present invention has been described by reference to certain embodiments of the invention, the invention is not limited to the embodiments described above. Modifications and variations of the embodiments can be made without departing from the spirit or scope of the appended claims. Therefore, the embodiments are only for illustrative purposes and not limit the invention.

Industrial Activity

A fuel system for vehicle according to the present invention can protect a high-voltage cable. The fuel system for vehicle of the present invention is expected to be used for a wide rage of vehicles.

The invention claimed is:

1. A fuel cell system for a vehicle, comprising:
a fuel cell configured to react fuel gas and oxidizing gas with each other and generate electricity;
a system frame attached under a floor of a body of the vehicle and supporting the fuel cell, the system frame comprising a pair of side frame members extending in a front-rear direction of the vehicle, and cross members connecting the side frame members;
a driving motor configured to drive the vehicle, and arranged in a motor compartment; and
a high-voltage cable configured to transmit high-voltage power generated by the fuel cell to the driving motor,
wherein the high-voltage cable has a part extended across the system frame,
wherein the part is arranged on an inner side of the system frame,
wherein at least one of the side frame members is hollow to provide a hollow frame member and accommodates the high-voltage cable therein to provide a static electricity shielding,
wherein the hollow frame member comprises a main body having an open cross section with an open side and a cover covering the open side of the main body,
wherein the high-voltage cable accommodated in the hollow frame member is encircled by a closed periphery formed by the main body and the cover of the hollow frame member, and
wherein a plane of the closed periphery lies in a direction that is perpendicular to a length direction of the high-voltage cable.

2. The fuel cell system of claim 1, wherein:
the motor compartment is formed on one of a front side and a rear side of the system frame.

3. The fuel cell system of claim 1, further comprising fuel cell accessories configured to operate when the fuel cell generates electricity, wherein at least one of the fuel cell accessories is fixed on the system frame.

4. The fuel cell system of claim 3, further comprising a power delivery module configured to deliver the high-voltage power generated by the fuel cell to the driving motor and the at least one of the fuel cell accessories, the power delivery module being accommodated in the motor compartment, wherein the part of the high-voltage cable is a part of the high-voltage cable between the fuel cell and the power delivery module.

5. The fuel cell system of claim 3, further comprising a power delivery module configured to deliver the high-voltage power generated by the fuel cell to the driving motor and the at least one of the fuel cell accessories, the power delivery module being arranged opposite to the motor compartment with the system frame being interposed between the power delivery module and the motor compartment, wherein the part of the high-voltage cable is a part of the high-voltage cable between the power delivery module and the driving motor.

6. The fuel cell system of claim 1, wherein:
the side frame members of the system frame are made of insulating material and conductive material.

7. The fuel cell system of claim 1, wherein:
the side frame members of the system frame are made of metal and covered with insulating material.

8. The fuel cell system of claim 1, wherein:
the hollow frame member accommodating the high-voltage cable is made of metal.

9. The fuel cell system of claim 1, further comprising fuel cell accessories configured to operate when the fuel cell generates electricity and supported on the system frame, wherein the fuel cell accessories supported on the system frame include fuel gas supply accessories related to supplying fuel gas to the fuel cell; and wherein the fuel gas supply accessories and the high-voltage cable are separated from each other in a vehicle width direction.

10. The fuel cell system of claim 9, wherein:

the fuel gas supply accessories include a mass flow controller configured to adjust a pressure and/or flow rate of fuel gas supplied from a fuel tank to the fuel cell and a fuel gas circulator configured to circulate an unconsumed fuel gas, which has not been used for power generation in the fuel cell and has been discharged from the fuel cell, to the fuel cell.

11. The fuel cell system of claim 9, wherein:

a fuel gas supply line configured to supply fuel gas from a fuel tank to the fuel gas supply accessories and the high-voltage cable are separated from each other in the vehicle width direction.

12. A vehicle, comprising:

a fuel cell configured to react fuel gas and oxidizing gas with each other and generate electricity;

a system frame attached under a floor of a body of the vehicle and supporting the fuel cell, the system frame comprising a pair of side frame members extending in a front-rear direction of the vehicle, and cross members connecting the side frame members;

a driving motor configured to drive the vehicle, and arranged in a motor compartment; and a high-voltage cable configured to transmit high-voltage power generated by the fuel cell to the driving motor, wherein the high-voltage cable has a part extending across the system frame, wherein the part is arranged on an inner side of the system frame, wherein at least one of the side frame members is hollow to provide a hollow frame member and accommodates the high-voltage cable therein to provide a static electricity shielding, wherein the hollow frame member comprises a main body having an open cross section with an open side and a cover covering the open side of the main body, wherein the high-voltage cable accommodated in the hollow frame member is encircled by a closed periphery formed by the main body and the cover of the hollow frame member, and wherein a plane of the closed periphery lies in a direction that is perpendicular to a length direction of the high-voltage cable.

13. The fuel cell system of claim 1, wherein:

the closed periphery is formed by extrusion.

* * * * *